United States Patent
Fujimoto et al.

(10) Patent No.: US 7,639,818 B2
(45) Date of Patent: Dec. 29, 2009

(54) STRUCTURED DOCUMENT SIGNATURE DEVICE, STRUCTURED DOCUMENT ADAPTATION DEVICE AND STRUCTURED DOCUMENT VERIFICATION DEVICE

(75) Inventors: Hiroshi Fujimoto, Yokohama (JP);
Takashi Suzuki, Yokosuka (JP);
Takehiro Nakayama, Yokohama (JP);
Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 711 days.

(21) Appl. No.: 10/942,866

(22) Filed: Sep. 17, 2004

(65) Prior Publication Data

US 2005/0063545 A1  Mar. 24, 2005

(30) Foreign Application Priority Data

Sep. 19, 2003  (JP) .............................. 2003-329176

(51) Int. Cl.
*H04L 9/00* (2006.01)
(52) U.S. Cl. .................. 380/277; 713/176; 713/193
(58) Field of Classification Search .................. 713/1, 713/2, 188, 194, 161; 380/200, 201, 255, 380/277; 726/2
See application file for complete search history.

(56) References Cited

U.S. PATENT DOCUMENTS

| | | | |
|---|---|---|---|
| 5,995,625 A | 11/1999 | Sudia et al. | |
| 6,097,811 A | 8/2000 | Micali | |
| 6,321,232 B1 * | 11/2001 | Syeda-Mahmood | 707/104.1 |
| 6,757,686 B1 * | 6/2004 | Syeda-Mahmood et al. | 707/100 |
| 6,959,384 B1 * | 10/2005 | Serret-Avila | 713/176 |
| 2001/0021928 A1 | 9/2001 | Ludwig et al. | |
| 2001/0034839 A1 * | 10/2001 | Karjoth et al. | 713/190 |
| 2004/0098384 A1 * | 5/2004 | Min et al. | 707/3 |
| 2004/0168073 A1 * | 8/2004 | Bourne et al. | 713/193 |
| 2005/0039034 A1 * | 2/2005 | Doyle et al. | 713/193 |
| 2005/0081059 A1 * | 4/2005 | Bandini et al. | 713/201 |
| 2007/0226366 A1 * | 9/2007 | Liou et al. | 709/238 |

FOREIGN PATENT DOCUMENTS

| | | |
|---|---|---|
| JP | 2002-229448 | 8/2002 |
| WO | WO 01/03363 A1 | 1/2001 |
| WO | WO 01/11843 A1 | 2/2001 |

* cited by examiner

*Primary Examiner*—Kimyen Vu
*Assistant Examiner*—Joseph Pan
(74) *Attorney, Agent, or Firm*—Oblon, Spivak, McClelland, Maier & Neustadt, L.L.P.

(57) ABSTRACT

A structured document signature device includes an adaptation policy associator configured to associate each element forming a structured document with an adaptation policy indicating an action which can be adapted to a child element of the element or a value of the element; a hash tree constructor configured to insert a hash value of the child element of the element or a hash value of the value of the element into the structured document as an attribute value of the element, and to construct a hash tree including the hash value; a digital signature adder configured to add a digital signature to a root of the hash tree and the adaptation policy; and an output configured to output the structured document and the digital signature.

9 Claims, 14 Drawing Sheets

FIG. 1

| FILE SIGNATURE CODE | 0xFF | DEPTH CODE | 0xFF | NODE SIGNATURE CODE (1) | 0xFF | NODE SIGNATURE CODE (2) | ...... |

FIG. 2

XML DOCUMENT

```
<? xml version = "1.0" encoding= "utf-8" ?>         DIGEST VALUE
<Document> ----------------------------------------> D1
    m0
    <Chapter1> ---------------------------------> D2
        m1
            <Section1-1>m11</Section1-1> -----> D3
            <Section1-2>m12</Section1-2> -----> D4
    </Chapter1>
    <Chapter2> ---------------------------------> D5
        m2
            <Section2-1>m21</Section2-1> -----> D6
            <Section2-2>m22</Section2-2> -----> D7
    </Chapter2>
</Document>
```

FIG. 3

XML DOCUMENT WITH A DIGITAL SIGNATURE

```
<? xmlversion = "1.0" encoding = "utf-8"?>
<Document>
    m0
    <Chapter1>
        m1
        <Section1-1> m11 </Section1-1>
        <Section1-2> m12 </Section1-2>
    </Chapter1>
    <Chapter2>
        m2
        <Section2-1> m21</Section2-1>
        <Section2-2> m22</Section2-2>
    </Chapter2>
    <Signature> D1+0xFF+0x02 +0xFF+D1+0xFF+D2+0xFF
+D3+0xFF+D4+0xFF+D5+0xFF+ D6+0xFF+D7 </Signature>
</Document>
```

FIG. 8

STRUCTURED DOCUMENT

```
<Document>
    m0
    <Chapter1>
        m1
        <Section1-1> m11 </Section1-1>
        <Section1-2> m12 </Section1-2>
    </Chapter1>
    <Chapter2>
        m2
        <Section2-1> m21 </Section2-1>
        <Section2-2> m22 </Section2-2>
    </Chapter2>
</Document>
```

FIG. 9

ADAPTATION POLICY

```
<Policy PolicyID="Policy1" PolicyCombiningAlgID="FirstApplicable">
    <Target/>
    <Rule Effect="Permit">
        <Target>
            <Subjects/>
            <Resources> <Resource>text()</Resource> </Resources>
            <Actions> <Action>delete</Action> </Actions>
        </Target>
    </Rule>
    <Rule Effect="Permit">
        <Target>
            <Subjects/>
            <Resources> <Resource> Section1-2</Resource> </Resources>
            <Actions> <Action>delete</Action> </Actions>
        </Target>
    </Rule>
    <Obligations> Write an operation to be requested when permitted </Obligations>
</Policy>
```

FIG. 10

STRUCTURED DOCUMENT WITH AN ADAPTATION POLICY

```
<Document Policy="#Policy0">
    m0
    <Chapter1 Policy="#Policy1">
        m1
        <Section1-1 Policy="#Policy11">m11</Section1-1>
        <Section1-2 Policy="#Policy12">m12</Section1-2>
    </Chapter1>
    <Chapter2 Policy="http://www.xyz.com/policy2.xml#Policy2">
        m2
        <Section2-1 Policy="#Policy21">m21</Section2-1>
        <Section2-2 Policy="#Policy22">m22</Section2-2>
    </Chapter2>
</Document>
```

FIG. 11

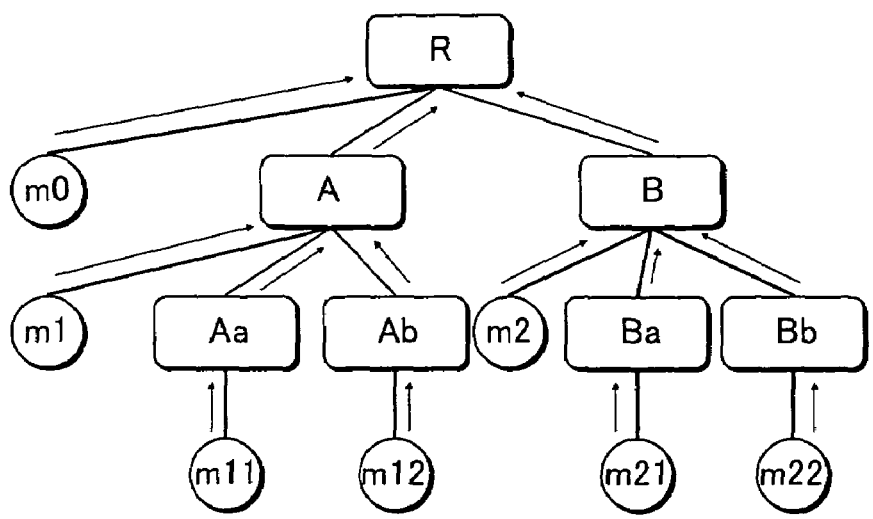

FIG. 12
STRUCTURED DOCUMENT INTO WHICH A HASH TREE IS INCORPORATED

```
<Document Policy="#Policy0" HashValue="h(m0)" HashChild1="A" HashChild2="B">  → R
    m0  → h(m0)
    <Chapter1 Policy="#Policy1" HashValue="h(m1)" HashChild1="Aa" HashChild2="Ab">→ A
        m1  → h(m1)
        <Section1-1 Policy="#Policy11" HashValue="h(m11)">  → Aa
            m11  → h(m11)
        </Section1-1>
        <Section1-2 Policy="#Policy12" HashValue="h(m12)">  → Ab
            m12  → h(m12)
        </Section1-2>
    </Chapter1>
    <Chapter2 Policy="http://www.xyz.com/policy2.xml#Policy2"
        HashValue="h(m2)" HashChild1="Ba" HashChild2="Bb">→ B
        m2  → h(m2)
        <Section2-1 Policy="#Policy21" HashValue="h(m21)">  → Ba
            m21  → h(m21)
        </Section2-1>
        <Section2-2 Policy="#Policy22" HashValue="h(m22)">  → Bb
            m22  → h(m22)
        </Section2-2>
    </Chapter2>
</Document>

→: HASH VALUE
```

FIG. 13
XML SIGNATURE

```
<Signature xmlns="http://www.w3.org/2000/09/xmldsig#">
    <SignedInfo>
        <CanonicalizationMethod
            Algorithm="http://www.w3.org/TR/2000/CR-xml-c14n-20001026"/>
        <SignatureMethod
            Algorithm="http://www.w3.org/2000/09/xmldsig#dsa-sha1"/>
        <Reference URI="#policy">
            <DigestMethod
                Algorithm="http://www.w3.org/2000/09/xmldsig#sha1"/>
            <DigestValue> HASH VALUE OF THE ADAPTATION POLICY </DigestValue>
        </Reference>
        <Reference URI="#document">
            <DigestMethod> ALGORITHM OF THE CONSTRUCTION OF THE HASH TREE </DigestMethod>
            <DigestValue> R </DigestValue>
        </Reference>
    </SignedInfo>
    <SignatureValue/>
    (<KeyInfo/>)
</Signature>
```

FIG. 14

```
<?xml version="1.0" encoding="UTF-16"?>
<ROOT>
    <AdaptationPolicyid="Policy"/>
    <Documentid="document"/>
    <Signature/>
</ROOT>
```

FIG. 15A

- Write the URL indicating the location of a policy
```
<AdaptationPolicy>
    <PolicyLocation>http://xyz.com/policy1.xml</PolicyLocation>
</AdaptationPolicy>
```

FIG. 15B

- Write a policy directly
```
<AdaptationPolicy>
    <PolicySet>
        <Policy id="#Policy0"/>
        <Policy id="#Policy1"/>
        <Policy id="#Policy2"/>
        ...
    </PolitcySet>
</AdaptationPolicy>
```

FIG. 16

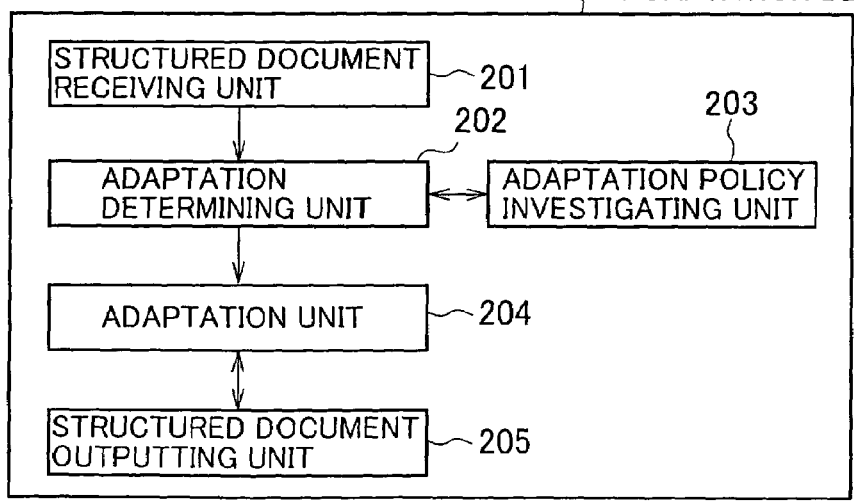

FIG. 19

RESPONSE

```
<Response>
   <Result>
      <Decision> permit </Decision>
      <Obligations> Write an operation to be requested </Obligations>
   </Result>
</Response>
```

FIG. 20

STRUCTURED DOCUMENT

```
<Document Policy="#Policy0" HashValue="h(m0)" HashChild1="A" HashChild2="B">
      m0
      <Chapter1 Policy="#Policy1" HashValue="h(m1)" HashChild1="Aa" HashChild2="Ab">
                  ← Delete m1
            <Section1-1 Policy="#Policy11" HashValue="h(m11)">
                  m11
            </Section1-1>
            <Section1-2 Policy="#Policy12" HashValue="h(m12)">
                  m12
            </Section1-2>
      </Chapter1>
      <Chapter2 Policy="http://www.xyz.com/policy2.xml#Policy2"
      HashValue="h(m2)" HashChild1="Ba" HashChild2="Bb">
            m2
            <Section2-1 Policy="#Policy21" HashValue="h(m21)">
                  m21
            </Section2-1>
            <Section2-2 Policy="#Policy22" HashValue="h(m22)">
                  m22
            </Section2-2>
      </Chapter2>
</Document>
```

STRUCTURED DOCUMENT

```
<Document Policy="#Policy0">
  m0
  <Chapter1 Policy="#Policy1" HashChild2="Ab">
      m1
      <Section1-1 Policy="#Policy11"> m11</Section1-1>
          ← Delete <Section1-2>
  </Chapter1>
  <Chapter2 Policy="http://www.xyz.com/policy2.xml#Policy2">
      m2
      <Section2-1Policy="#Policy21"> m21</Section2-1>
      <Section2-2 Policy="#Policy22"> m22</Section2-2>
  </Chapter2>
</Document>
```

FIG. 25

ADAPTATION POLICY

```
<Policy Policy="#Policy13" PolicyCombiningAlgID="FirstApplicable">
    <Target/>
    <Rule Effect="Permit">
        <Target>
            <Subjects> <Subject>e13</Subject> <Subjects>
            <Resources> <Resource>text() </Resource> </Resources>
            <Actions> <Action>add </Action> </Actions>
        </Target>
    </Rule>
    <Obligations> Write an operation to be requested when permitte </Obligations>
</Policy>
```

FIG. 26

STRUCTURED DOCUMENT

```
<Document Policy="#Policy0">
    m0
    <Chapter1 Policy="#Policy1">
        m1
        <Section1-1 Policy="#Policy11">m11</Section1-1>
        <Section1-2 Policy="#Policy12">m12</Section1-2>
        <Section1-3 Policy="#Policy13" Verifier="verifier13" Key="PKe1">
        </Section1-3>
    </Chapter1>
    <Chapter2 Policy="http://www.xyz.com/policy2.xml#Policy2">
        m2
        <Section2-1 Policy="#Policy21"> m21</Section2-1>
        <Section2-2 Policy="#Policy22"> m22</Section2-2>
    </Chapter2>
</Document>
```

FIG. 27

```
<Section1-3 Policy="#Policy13" Verifier="h(verifier13)" Key="PKe1">  → An element
                                                                       forming a
                                                                       hash tree
```

FIG. 28

STRUCTURED DOCUMENT

```
<Document Policy="#Policy0">
        m0
        <Chapter1 Policy="#Policy1">
                m1
                <Section1-1 Policy="#Policy11">m11</Section1-1>
                <Section1-2 Policy="#Policy12">m12</Section1-2>
                <Section1-3 Policy="#Policy13" Verifier="h(verifier13)" Key="PKe1">
                m13
                </Section1-3>
        </Chapter1>
        <Chapter2 Policy="http://www.xyz.com/policy2.xml#Policy2">
                m2
                <Section2-1 Policy="#Policy21">m21</Section2-1>
                <Section2-2 Policy="#Policy22">m22</Section2-2>
        </Chapter2>
</Document>
```

FIG. 29

```
<?xmlversion="1.0" encoding="UTF-16"?>
<ROOT>
        <AdaptationPolicy id="#Policy"/>
        <Document id="document"/>
        <Signature/>
        <Signature/>  ← A digital signature of the structured document adaptation device
</ROOT>
```

FIG. 30

XML SIGNATURE

```
<Signature xmlns="http://www.w3.org/2000/09/xmldsig#">
    <SignedInfo>
            <CanonicalizationMethod
                    Algorithm="http://www.w3.org/TR/2000/CR-xml-c14n-20001026"/>
            <SignatureMethod
                    Algorithm="http://www.w3.org/2000/09/xmldsig#dsa-sha1"/>
            <Reference URI="#section1-3">
                    <DigestMethod
                            Algorithm="http://www.w3.org/2000/09/xmldsig#sha1"/>
                    <DigestValue> <Section1-3/>Hash value of the element </DigestValue>
            </Reference>
    </SignedInfo>
    <SignatureValue/> ←Provide a signature by use of the secret key corresponding to PKe13
    (<KeyInfo/>)
</Signature>
```

FIG. 31

STRUCTURED DOCUMENT

```
<Document Policy="#Policy0">
  m0
  <Chapter1 Policy="#Policy1">
      m1
      <Section1-1 Policy="#Policy11">m11</Section1-1>
      <Section1-2 Policy="#Policy12"> m12</Section1-2>
      <Section1-3 Policy="#Policy13" TrapdoorHashValue="H(m13',r13')"TrapdoorValue="r13'">
      m13'
      </Section1-3>
  </Chapter1>
  <Chapter2 Policy="http://www.xyz.com/policy2.xml#Policy2">
      m2
      <Section2-1 Policy="#Policy21"> m21</Section2-1>
      <Section2-2 Policy="#Policy22"> m22</Section2-2>
  </Chapter2>
</Document>
```

FIG. 32

```
<Section1-3 Policy="#Policy13" TrapdoorHashValue=" H(m13',r13')">  → An element
                                                                    forming a hash
                                                                    tree
```

FIG. 33

STRUCTURED DOCUMENT

```
<Document Policy="#Policy0">
  m0
  <Chapter1 Policy="#Policy1">
      m1
      <Section1-1 Policy="#Policy11">m11</Section1-1>
      <Section1-2 Policy="#Policy12"> m12</Section1-2>
      <Section1-3 Policy="#Policy13" TrapdoorHashValue="H(m13',r13')" TrapdoorValue="r13">
      m13
      </Section1-3>
  </Chapter1>
  <Chapter2 Policy="http://www.xyz.com/policy2.xml#Policy2">
      m2
      <Section2-1 Policy="#Policy21"> m21</Section2-1>
      <Section2-2 Policy="#Policy22"> m22</Section2-2>
  </Chapter2>
</Document>
```

STRUCTURED DOCUMENT SIGNATURE DEVICE, STRUCTURED DOCUMENT ADAPTATION DEVICE AND STRUCTURED DOCUMENT VERIFICATION DEVICE

CROSS REFERENCE TO RELATED APPLICATION

This application is based upon and claims the benefit of priority from the prior Japanese Patent Applications No. P2003-329175, filed on Sep. 19, 2003; the entire contents of which are incorporated herein by reference.

BACKGROUND OF THE INVENTION

1. Field of the Invention

The present invention relates to a structured document signature device, a structured document adaptation device and a structured document verification device.

2. Description of the Related Art

With reference to FIGS. 1 to 3, a description will be provided for a conventional digital signature method applied to a structured document.

FIG. 1 shows a format of a digital signature file in the conventional digital signature method applied to the structured document.

In FIG. 1, a "file signature code" indicates a digest value of an overall digital signature file, and a "depth code" indicates to what depth digest values of elements shall be included in the digital signature file. In addition, a plurality of "node signature codes" indicate digest values of the respective elements which are present in a range of depth specified by the depth code.

According to the conventional digital signature method applied to the structured document, the digest value of each element is concatenated with the digest value of an overall structured document, and a digital signature is added to a concatenated value.

For example, in an XML (eXtensible Markup Language) document (a structured document) shown in FIG. 2, when digest values D1 to D7 of the respective elements (e.g. <Document>) are calculated and the conventional digital signature method applied to the structured document is adapted to the digest values, an XML document with the digital signature shown in FIG. 3 is obtained.

In FIG. 3, the authenticity of the overall XML document shown in FIG. 2 can be verified by the digest value D1 of the element "<Document>", and the authenticity of each element of the XML document can be verified by the digest value D2 of an element "<Chapter1>", the digest value D3 of an element "<Section1-1> m11 </Section1-1>" and the like.

In this manner, the conventional digital signature method applied to the structured document can detect not only a modification of the overall structured document, but also a modification of each element forming the structured document.

In recent years, various structured documents represented by XML documents have been used in various services realized in a wide area network such as the Internet.

For example, a Web service, which is one of the most typical services, provides multimedia contents by use of a structured document (an HTML document) written in the HTML.

In addition, when a structured document written in an XML-compliant language which is termed as "SMIL" is used, not only a moving image and a sound can be delivered, but also a combination of various multimedia contents such as an animation, a still image and a text can be delivered.

In this manner, multimedia contents have been delivered in the form of structured documents in an increasing number of occasions. Hereinafter, when a structured document is referred to, it is assumed that the structured document includes multimedia contents.

On the other hand, as one of technologies for delivering multimedia contents, attention has been paid to a technology of adapting a structured document concerned with a service to be provided, in response to a user's environments (processing capabilities of a terminal device and a network, the user's location, time and the like) and the user's status (the user's age, affiliation, and license).

When a structured document is intended to be adapted, each element forming the structured document is an object to be adapted.

In this manner, when a provider intends to provide a digital signature to a structured document to be adapted, and when the digital signature is added to the digest value of the overall structured document in the same way as the conventional digital signature method applied to the structured document, the structured document is modified by the adaptation. Consequently, the authenticity of the structured document received can not be verified in a receiving terminal.

With regard to such a problem, according to the conventional digital signature method applied to the structured document, the digest value of each element is concatenated with the digest value of the overall structured document, and a digital signature is added to the concatenated values.

As a result, in a receiving terminal, the authenticity of each element can be verified. For this reason, the authenticity of an element which has not been adapted can be verified. For example, even if the value of an element is deleted, the authenticities of the other elements can be verified in a receiving terminal.

However, according to the conventional digital signature method applied to the structured document, nothing but the authenticity of an unadapted element can be verified, there is a problem in that it can not be verified whether or not the adaptation has been actually permitted by the provider of the structured document.

In addition, according to the conventional digital signature method applied to the structured document, the adaptation can be performed when the value of an element is deleted.

However, in a case where the adaptation is intended to be performed when an element itself is added, there is a disadvantage in that, if it is not clear whether or not the element has been added, the authentication of a digital signature which has been added by the sender can not be verified in the receiving terminal.

Furthermore, in the conventional digital signature method applied to the structured document, there is a disadvantage in that, if an element which has been added is deleted later, this fact can not be detected.

BRIEF SUMMARY OF THE INVENTION

In viewing of the foregoing, it is an object of the present invention to provide a structured document signature device, a structured document adaptation device and a structured document verification device, which enable the aforementioned problems to be solved in a digital signature method applied to the structured document.

A first aspect of the present invention is summarized as a structured document signature device including an adaptation policy associator configured to associate each element forming a structured document with an adaptation policy indicating an action which can be adapted to a child element of the element or a value of the element; a hash tree constructor configured to insert a hash value of the child element of the element or a hash value of the value of the element into the structured document as an attribute value of the element, and to construct a hash tree including the hash value; a digital signature adder configured to add a digital signature to a root of the hash tree and the adaptation policy; and an output configured to output the structured document and the digital signature.

In the first aspect, the output can be configured to output the adaptation policy along with the structured document and the digital signatures.

In the first aspect, the adaptation policy associator can be configured to associate the element with the adaptation policy, by use of information indicating the location of the adaptation policy.

In the first aspect, the adaptation policy associator can include a compiler configured to compile the adaptation policy.

In the first aspect, the hash tree constructor can be configured to delete the hash value of the child element of the element or the hash value of the value of the element, after calculating the root of the hash tree. Here, the hash value has been inserted as the attribute value of the element.

In the first aspect, structured document signature device can include a verification means setter configured to set verification means for verifying whether or not an addition of a value in violation of the adaptation policy associated with the element has not been made to the element.

A second aspect of the present invention is summarized as a structured document adaptation device including a determiner configured to determine a type of an adaptation applied to an element or a value of the element, the element forming a structured document; an investigator configured to investigate whether or not a determined adaptation is permitted to be applied to the element or the value of the element on a basis of the adaptation policy specified by the structured document; and an adapter configured to apply the adaptation to the element or the value of the element in response to a result of the investigation.

In the second aspect, the adapter can be configured to delete the element or the value of the element, and to insert the hash value of a deleted element as an attribute value of a parent element of the element or to insert the hash value of a deleted value of the element as an attribute value of the element.

In the second aspect, the adapter can include verification means for verifying that an adaptation in violation of the adaptation policy is not applied to the element when the value of the element is added.

A third aspect of the present invention is summarized as a structured document verification device including an adaptation verifier configured to verify whether or not a structured document has been adapted in accordance with a adaptation policy specified by the structured document; a hash tree reconstructor configured to insert a hash value of a value of an element or a hash value of a child element of the element into the structured document as an attribute value of the element, and to reconstruct a hash tree including the hash value, the element forming the structured document; and a digital signature verifier configured to verify an authenticity of a digital signature added to the structured document, on a basis of a root of a reconstructed hash tree and the adaptation policy.

In the third aspect, the hash tree reconstructor can be configured to reconstruct the hash tree including the hash value of the value of the element or the hash value of the child element of the element inserted as the attribute value of the element, when the value of the element or the child element of the element has been deleted respectively.

In the third aspect, the hash tree reconstructor can be configured to verify whether or not an adaptation has been applied to an element to which the value is permitted to be added, in accordance with the adaptation policy

BRIEF DESCRIPTION OF THE SEVERAL VIEWS OF THE DRAWINGS

FIG. 1 is a diagram showing a format of a digital signature file according to a prior art.

FIG. 2 is a diagram showing an example of a structured document used in a digital signature method according to the prior art.

FIG. 3 is a diagram showing an example of a structured document with a digital signature used in a digital signature method according to the prior art.

FIG. 8 is a diagram showing an example of an XML description of the structured document used in the first embodiment of the present invention.

FIG. 9 is a diagram showing an example of an adaptation policy used in the first embodiment of the present invention.

FIG. 10 is a diagram showing an example of a structured document with an adaptation policy generated by the structured document signature device according to the first embodiment of the present invention.

FIG. 11 is a diagram showing an example of a tree structure of a hash tree constructed by the structured document signature device according to the first embodiment of the present invention.

FIG. 12 is a diagram showing an example of a structured document in which the hash tree constructed by the structured document signature device according to the first embodiment of the present invention is incorporated.

FIG. 13 is a diagram showing an example of an XML signature generated by the structured document signature device according to the first embodiment of the present invention.

FIG. 14 is a diagram showing an example of a document outputted from the structured document signature device according to the first embodiment of the present invention.

FIGS. 15A and 15B are diagrams showing a method for specifying an adaptation policy in the document outputted from the structured document signature device according to the first embodiment of the present invention.

FIG. 16 is a block diagram showing a function of a structured document adaptation device according to embodiments of the present invention.

FIG. 19 is a diagram showing an example of a response generated by the structured document adaptation device according to the first embodiment of the present invention.

FIG. 20 is a diagram showing an example of a structured document to be obtained after an adaptation is performed by the structured document adaptation device according to the first embodiment of the present invention.

FIG. 25 is a diagram showing an example of an adaptation policy used in the third embodiment of the present invention.

FIG. 26 is a diagram showing an example of a structured document with an adaptation policy generated by a structured document signature device according to the third embodiment of the present invention.

FIG. 27 is a diagram showing an example of an element constituting a hash tree corresponding to an element to which data calculated by the structured document signature device according to the third embodiment of the present invention is permitted to be added.

FIG. 28 is a diagram showing an example of a structured document to be obtained after an adaptation is performed by a structured document adaptation device according to the third embodiment of the present invention.

FIG. 29 is a diagram showing an example of a document outputted from the structured document adaptation device according to the third embodiment of the present invention.

FIG. 30 is a diagram showing an example of an XML signature used in the third embodiment of the present invention.

FIG. 31 is a diagram showing an example of a structured document with an adaptation policy generated by a structured document signature device according to a fourth embodiment of the present invention.

FIG. 32 is a diagram showing an example of an element constituting a hash tree corresponding to an element to which data calculated by the structured document signature device according to the fourth embodiment of the present invention is permitted to be added.

FIG. 33 is a diagram showing an example of a structured document with an adaptation policy, to which data has been added by a structured document adaptation device according to the fourth embodiment of the present invention

DETAILED DESCRIPTION OF THE INVENTION

A First Embodiment of the Present Invention

Figure 4:
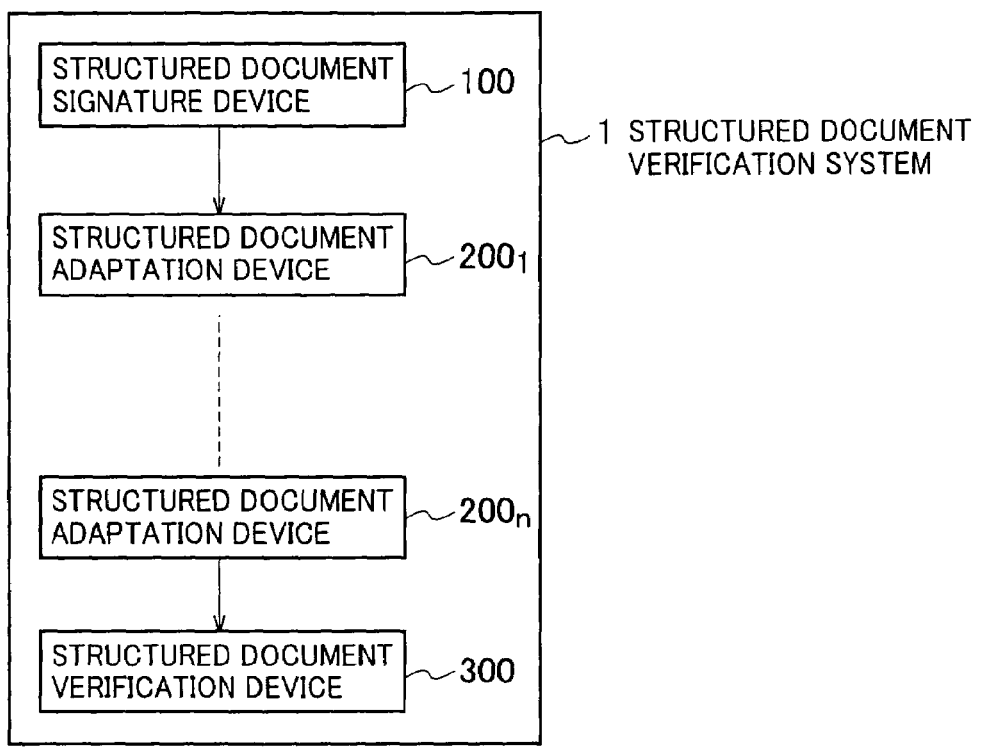
FIG. 4 is a schematic diagram of a structured document verification system according to embodiments of the present invention.

A description will be provided below for a structured document verification system according to a first embodiment of the present invention with reference to drawings. FIG. 4 is a diagram showing an entire configuration of the structured document verification system 1 according to the first embodiment of the present invention.

As shown in FIG. 4, the structured document verification system 1 according to the first embodiment includes a structured document signature device 100, one or more structured document adaptation devices $200_1$ to $200_n$, and a structured document verification device 300.

In the first embodiment, the structured document signature device 100 can put forth an adaptation policy to a structured document to which a digital signature is to be added.

The structured document verification device 300 can verify whether or not a structured document with a digital signature to be verified complies with an adaptation policy, and whether or not the structured document with the digital signature to be verified has been outputted by the structured document signature device 100.

A detailed description will be provided below for the structured document signature device 100, the structured document adaptation device 200 and the structured document verification device 300.

Figure 5:
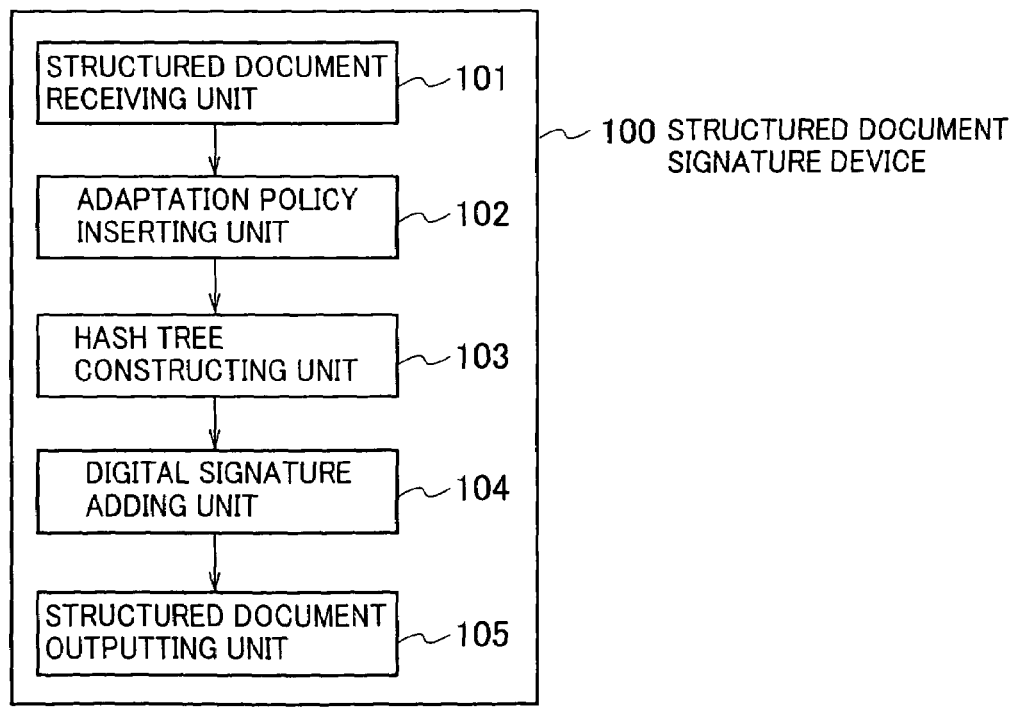
FIG. 5 is a block diagram showing a function of a structured document signature device according to the embodiments of the present invention.

First of all, a description will be provided for the structured document signature device 100. As shown in FIG. 5, the structured document signature device 100 includes a structured document receiving unit 101, an adaptation policy inserting unit 102, a hash tree constructing unit 103, a digital signature adding unit 104, and a structured document outputting unit 105.

The structured document receiving unit 101 is configured to receive a structured document (for example, an XML document). The structured document is formed by elements and values of the elements. Specific examples of the element and the value of the element will be described later.

The adaptation policy inserting unit 102 is configured to associate the respective elements forming the structured document with an adaptation policy. The adaptation policy is configured to indicate an action which can be adapted to a child element of the element or a value of the element. A specific example of the adaptation policy will be described later.

In addition, the adaptation policy inserting unit 102 may be configured in order that the adaptation policy is associated with the respective elements forming the structured document, by use of information (for example, a URL: Uniform Resource Locator) indicating a location of the adaptation policy.

Furthermore, the adaptation policy inserting unit 102 may include a complier configured to compile the adaptation policy.

The hash tree constructing unit 103 is configured to construct a hash tree including the hash values of respective elements and the hash values of values of the respective elements forming the structured document, based on the structured document in which the adaptation policy is associated with the respective elements (a structured document with an adaptation policy).

Specifically, the hash tree constructing unit 103 is configured to insert the hash values of the child elements of the respective element and the hash values of the values of the respective elements into the structured document as attribute values of the respective elements forming the structured document.

The hash tree constructing unit 103 is configured to construct a hash tree formed by the hash values of the respective elements including the attribute values.

Incidentally, a detailed description will be provided later for the method for constructing the hash tree.

The digital signature providing unit 104 is configured to add a digital signature to a root of the hash tree, and to add a digital signature to the adaptation policy.

Specifically, the digital signature providing unit 104 is configured to add, to the root of the hash tree, a digital signature which has been obtained by encrypting the root of the hash tree by use of the private key of the structured document signature device 100.

And the digital signature providing unit 104 is configured to add, to the adaptation policy, a digital signature which has been obtained by encrypting the adaptation policy by use of the private key of the structured document signature device 100.

The structured document outputting unit 105 is configured to output the structured document to which the digital signature has been added.

The structured document outputting unit 105 can also output the adaptation policy to which the digital signature has been assed along with the structured document to which the digital signature has been added.

Figure 6:
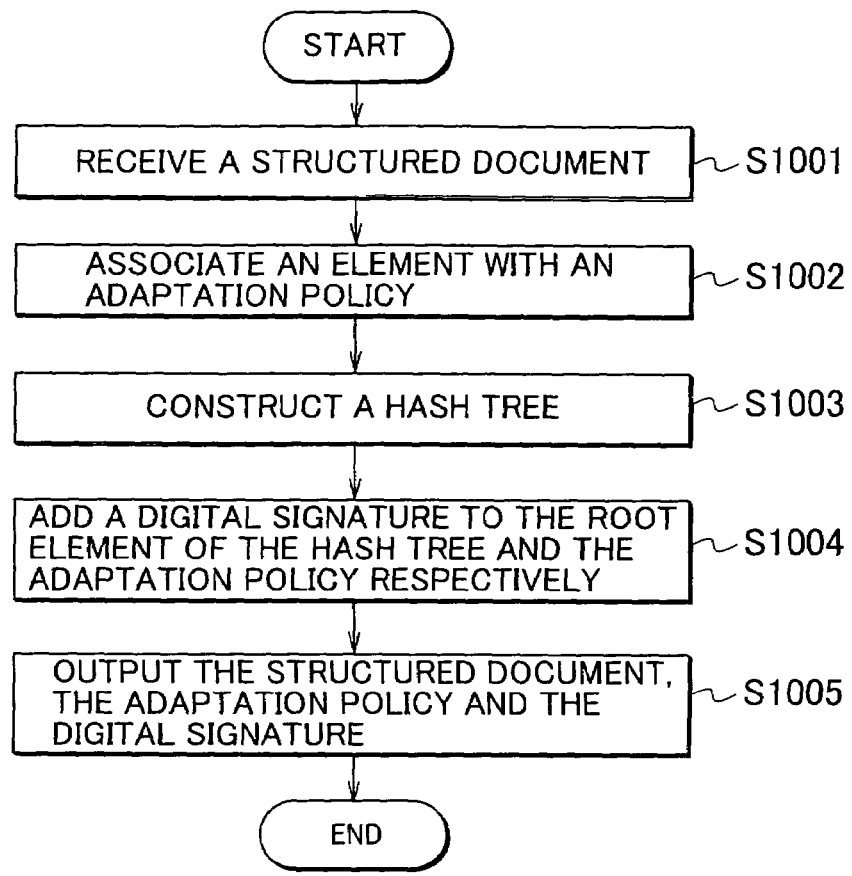
FIG. 6 is a flowchart showing an operation of a structured document signature device according to a first embodiment of the present invention.
Figure 7:
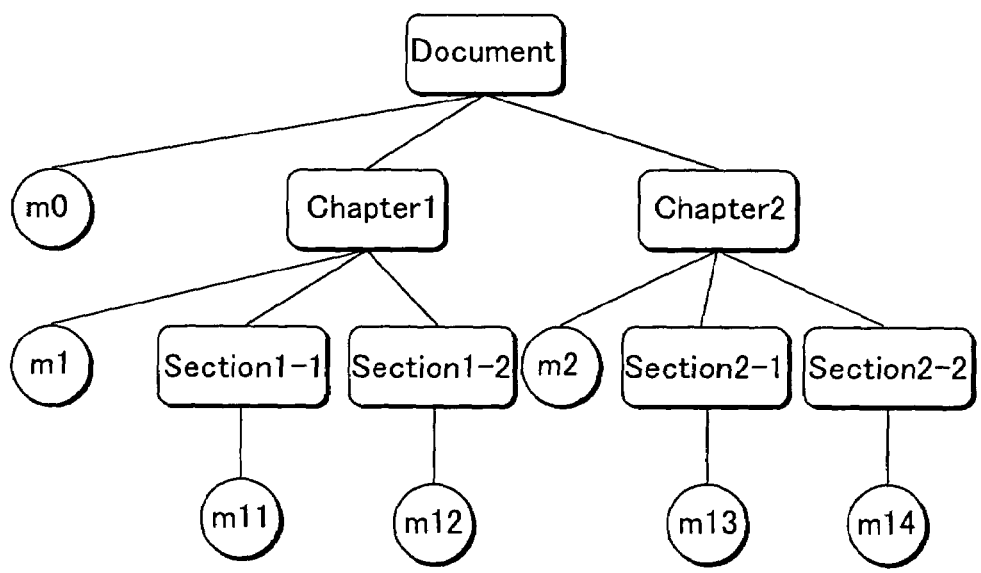
FIG. 7 is a diagram showing an example of a tree structure of a structured document used in the first embodiment of the present invention.

With reference to FIGS. 6 to 15, a specific description will be provided for an operation of the structured document signature device 100. Here, it is assumed that a structured document (an XML document) shown in FIGS. 7 and 8 is used.

FIG. 7 shows a structure of the tree of the structured document. A rectangle denotes an "element", and a circle denotes "the value of an element (the value which an element has)". In addition, FIG. 8 shows the structured document written in the XML.

As shown in FIG. 6, in step 1001, the structured document receiving unit 101 analyzes a received structured document, and outputs the structured document to the adaptation policy inserting unit 102.

A structured document shown in FIG. 8 includes elements <Document>, <Chapter1>, <Chapter2>, <Section1-1>, <Section1-2>, <Section2-1> and <Section2-2>.

In this point, the elements <Chapter1> and <Chapter2> are the child elements of the element <Document>. The elements <Section1-1> and <Section1-2> are the child elements of the element <Chapter1>. The elements <Section2-1> and <Section2-2> are the child elements of the element <Chapter2>.

Furthermore, the value of the element <Document> is "m0". The value of the element <Chapter1> is "m1". The value of the element <Chapter2> is "m2". The value of the element <Section1-1> is "m11". The value of the element <Section1-2> is "m12". The value of the element <Section2-1> is "m21". The value of the element <Section2-2> is "m22".

In step 1002, in a case where an element (for example, <Document>) has a child element (for example, <Chapter1>) or a value (for example, "m0"), the adaptation policy inserting unit 102 associates a predetermined adaptation policy (for example, "Policy 0") with the element (for example, <Document>).

For example, the adaptation policy inserting unit 102 incorporates a URI (Uniform Resource Identifier) indicating a predetermined adaptation policy as the attribute value of the element, thereby associating the predetermined adaptation policy with the element.

Incidentally, when the predetermined adaptation policy is associated with the element, the adaptation policy inserting unit 102 can compile the adaptation policy.

The adaptation policy inserting unit 102 performs the aforementioned process of associating adaptation policies with all the elements forming the structured document respectively.

FIG. 9 shows an example of an adaptation policy written in the XACML (extensible Access Control Markup Language).

As shown in FIG. 9, an adaptation policy, which is associated with an element, has a policy indicating an action which can be adapted to each of the value of the element and the child elements of the element. For this reason, the adaptation policy has a plurality of elements <Rule>.

An adaptation policy shown in FIG. 9 has 2 elements <Rule>. The first element <Rule> is configured to permit the value of an element, with which the adaptation policy is associated, to be deleted. The second element <Rule> is configured to permit a child element (in this case, the element <Section1-2>) of an element, with which the adaptation policy is associated, to be deleted.

For example, in a case where the adaptation policy shown in FIG. 9 is associated with the element <Chapter1>, the adaptation policy permits the value of the element <Chapter1> and the element <Section1-2> which is a child element of the element <Chapter1> to be deleted.

Incidentally, with regard to an element and a value of the element which are not written in the adaptation policy, all the adaptations are prohibited.

In addition, the adaptation policy may be outputted along with the structured document, or may be stored as an external document in a different location.

FIG. 10 shows a structured document with adaptation policies written in the XML. Here, a URI of the adaptation policy is inserted as the attribute value of each element forming the structured document with the adaptation policy.

For example, in the structured document with the adaptation policies shown in FIG. 10, the URI (#Policy1) of the adaptation policy is inserted as the attribute value of the element <Chapter1>, thereby associating the adaptation policy "Policy1" with the element <Chapter1>, as<Chapter1 Policy="#Policy1">. In such a case, the adaptation policy "Policy1" is outputted along with the structured document.

In addition, in the structured document with the adaptation policy shown in FIG. 10, it is possible that information (URL) indicating the location of an adaptation "policy" Policy2' is inserted as the attribute value of the element <Chapter2>, thereby associating the adaptation policy "Policy2" with the element <Chapter2>, as <Chapter2 Policy="http://www.xyz.com/policy2.xm1#Policy2">. In such a case, the adaptation policy "Policy2" is an external document stored in a different location.

In step 1003, the hash tree constructing unit 103 constructs a hash tree on a basis of the structured document with the adaptation policy (see FIG. 11), and incorporates the elements forming the hash tree into the attribute values of the respective elements forming the structured document (see FIG. 12).

FIG. 11 shows the hash tree constructed on a basis of the structured document with the adaptation policies shown in FIG. 10.

The hash tree shown in FIG. 11 has the same structure as the structure of the hash tree shown in FIG. 7. An alphabet or alphabets in a rectangle indicates an element (for example, A) forming the hash tree, corresponding to an element (for example, the element <Chapter1>) shown in FIG. 7.

These alphabets are calculated as hash values of starting tags (for example, <Chapter1 Policy="#Policy1" HashValue="h(m1)" HashChild1="Aa" HashChild2="Ab">) of the respective elements, as shown in FIG. 12.

As shown in FIG. 11, the elements forming the hash tree include the hash value "R" of the starting tag of the element <Document>, the hash value "A" of the starting tag of the element <Chapter1>, the hash value "B" of the starting tag of the element <Chapter2>, the hash value "Aa" of the starting tag of the element <Section1-1>, the hash value "Ab" of the starting tag of the element <Section1-2>, the hash value "Ba" of the starting tag of the element <Section2-1>, the hash value "Bb" of the starting tag of the element <Section2-2>, the hash value "h(m0)" of the value "m0" of the element <Document>, the hash value "h(m1)" of the value "m1" of the element <Chapter1>, the hash value "h(m2)" of the value "m2" of the element <Chapter2>, the hash value "h(m11)" of the value "m11" of the element <Section1-1>, the hash value "h(m12)" of the value "m12" of the element <Section1-2>, the hash value "h(m21)" of the value "m21" of the element <Section2-1>, and the hash value "h(m22)" of the value "m22" of the element <Section2-2>.

Hereinafter, it is assumed that the hash value of an element <XYZ> is synonymous with the hash value of the starting tag of the element <XYZ>.

Specifically, in a case where an element has a value, the hash tree constructing unit 103 inserts the hash value of the value of the element as the attribute value of the element. Then, in a case where the element has a child element, the hash tree constructing unit 103 inserts the hash value of the child element as the attribute value of the element.

After the hash tree constructing unit 103 finished substituting the hash value of the value of the element and the hash values of all the child elements that the element has, the hash tree constructing unit 103 calculates the hash value of the element including the hash value of the value and the hash values of the child elements (the attribute values), and turns the hash value of the element into the element forming the hash tree corresponding to the element.

The hash tree constructing unit 103 recursively performs the substituting of the hash value of the value of the element and the hash values of all the child elements of the element for all the elements forming the structured document, thereby introducing the elements forming the hash tree corresponding to the respective elements and incorporating the elements forming the hash tree into the structured document.

In other words, the hash tree constructing unit 103 performs a process, as described above, for introducing (a process for incorporating) an element forming a hash tree sequentially from an element which does not have a child element (for example, the element <Section1-1>) to an element which does not have a parent element (for example, the element <Document>).

FIG. 12 shows how an element forming the hash tree shown in FIG. 11 is incorporated into the structured document with the adaptation policy shown in FIG. 10.

Here, the starting tag of each element includes the hash value of the value of the element in the attribute value 'HashValue', and includes elements forming a hash tree corresponding to an eldest son element and a second son element and the like in the respective attribute values 'HashChild1', 'HashChild2' and the like.

Consequently, each element includes the hash value of the value of the element and the hash values of the child elements (the eldest son element, the second son element and the like) of the element. Since the hash value of each element is turned into an element forming a new hash tree, this enables the hash tree to be incorporated into the structured document.

In an example shown by FIG. 12, a URI "#Policy0" indicating an adaptation policy, the hash value "h(m0)" of the value "m0" of the element <Document>, the hash value "A" of the element <Chapter1> which is a child element (the eldest son element) of the element <Document>, and the hash value 'B' of the element <Chapter2> which is a child element (the second son element) of the element <Document> are inserted as the attribute value of the element <Document>.

Incidentally, in FIG. 12, the hash value "R" of the element <Document> which is the root element of the hash tree is the root of the hash tree, and is an object to which a digital signature is adapted.

A URI "#Policy1" indicating an adaptation policy, the hash value "h(m1)" of the value "m1" of the element <Chapter1>, the hash value "Aa" of the element <Section1-1> which is a child element (the eldest son element) of the element <Chapter1>, and the hash value "Ab" of the element <Section1-2> which is a child element (the second son element) of the element <Chapter1> are inserted as the attribute value of the element <Chapter1>.

In addition, a URI "#Policy2" indicating an adaptation policy, the hash value "h(m2) " of the value "m2" of the element <Chapter2>, the hash value "Ba" of an element <Section2-1> which is a child element (the eldest son element) of the element <Chapter2>, and the hash value 'Bb' of the element <Section2-2> which is a child element (the second son element) of the element <Chapter2> are inserted as the attribute value of the element <Chapter2>.

Furthermore, a URI "#Policy11" indicating an adaptation policy, and the hash value "h(m11)" of the value "m11" of the element <Section1-1> are inserted as the attribute value of the element <Section1-1>.

Additionally, a URI "#Policy12" indicating an adaptation policy, and the hash value "h(m12)" of the value "m12" of the element <Section1-2> are inserted as the attribute value of the element <Section1-2>.

Further, a URI "#Policy21" indicating an adaptation policy, and the hash value "h(m21)" of the value "m21" of the element <Section2-1> are inserted as the attribute value of the element <Section2-1>.

In addition, a URI "#Policy22" indicating an adaptation policy, and the hash value "h(m22)" of the value "m22" of the element <Section2-2> are inserted as the attribute value of the element <Section2-2>.

After this, the hash tree constructing unit 103 outputs a structured document into which a hash tree is incorporated.

In step 1004, the digital signature adding unit 104 adds a digital signature to the root "R" of the hash tree. For example, the digital signature adding unit 104 can perform the addition of the aforementioned digital signature by use of an XML signature.

In addition, in a case where the adaptation policy is outputted along with the structured document, the digital signature providing unit 104 adds a digital signature to the adaptation policy.

An example of an XML signature generated by the digital signature adding unit 104 is shown in FIG. 13. As shown in FIG. 13, the digital signature adding unit 104 generates an element <Reference> for each of an "adaptation policy" and a "root of the hash tree" which are objects to be provided with a signature. Here, the elements <Reference> include a URI indicating an object to be provided with a signature as the attribute value.

The hash value of the adaptation policy is inserted as an element <DigestValue> in the element <Reference> concerning the "adaptation policy".

A root "R" of the hash tree is inserted as an element <DigestValue> in the element <Reference> concerning the "root of the hash tree".

The digital signature adding unit 104 adds a digital signature to an element <SignedInfo> including the two elements <Reference>. In other words, the digital signature adding unit 104 inserts the digital signature as an element <SignatureValue>.

In step 1005, the structured document outputting unit 105 outputs the structured document into which the hash tree has been incorporated and the digital signature (the XML signature). Incidentally, the structured document outputting unit 105 can also output the adaptation policy along with the structured document into which the hash tree has been incorporated and the digital signature (the XML signature).

For example, the structured document outputting unit 105 outputs a document as shown in FIG. 14. In this point, an element <AdaptationPolicy> specifies an adaptation policy, an element <Document> specifies a structured document to be provided, and an element <Signature> specifies a digital signature which has been added to the adaptation policy and the structured document by use of an XML signature.

Incidentally, as shown in FIG. 15A, the element <AdaptationPolicy> may specify an adaptation policy by a URL indicating the location of the adaptation policy by use of an element <PolicyLocation>. Or else, as shown in FIG. 15B, the element <AdaptationPolicy> may directly specify an adaptation policy in accordance with a writing method in the XACML by use of an element <Policy>.

Secondly, a description will be provided for the structured document adaptation device 200. As shown in FIG. 16, the structured document adaptation device 200 includes a structured document receiving unit 201, an adaptation determining unit 202, an adaptation policy investigating unit 203, an adaptation unit 204, and a structured document outputting unit 205.

The structured document receiving unit 201 is configured to analyze a received structured document, and to output an analyzed document to the adaptation determining unit 202.

The adaptation determining unit 202 is configured to determine a type of adaptation applied to each element forming a structured document or the value of the element. In other words, the adaptation determining unit 202 is configured to determine contents and an object of the adaptation in an received structured document.

The adaptation policy investigating unit 203 is configured to investigate whether or not an adaptation which has been determined by the adaptation determining unit 202 is permitted for the element or the value of the element, on a basis of an adaptation policy specified by the structured document.

For example, the adaptation policy investigating unit 203 refers to the adaptation policy set by the structured document signature device 100, and investigates whether or not the adaptation which has been determined by the adaptation determining unit 202 is permitted by the adaptation policy.

The adaptation unit 204 is configured to perform an adaptation to the element or the value of the element in response to a result of an investigation by the adaptation policy investigating unit 203. The structured document outputting unit 205 is configured to output an adapted structured document.

With reference to FIGS. 17 to 20, a specific description will be provided for an operation to be performed in a case where a type of an adaptation is "deletion of data (an element or a value of an element)" in the structured document adaptation device 200.

In step 2001, the structured document receiving unit 201 analyzes a received structured document, and outputs an analyzed document to the adaptation determining unit 202.

In step 2002, in a case where a type of an adaptation is "deletion of an element", the adaptation determining unit 202 inquires to the adaptation policy investigating unit 203 whether or not the deletion of the element, which is an object to be deleted, is permitted by the adaptation policy.

In addition, in a case where a type of an adaptation is "deletion of the value of an element", the adaptation determining unit 202 inquires to the adaptation policy investigating unit 203 whether or not the deletion of the value of the element, which is an object to be deleted, is permitted by the adaptation policy.

Figures 17, 18:
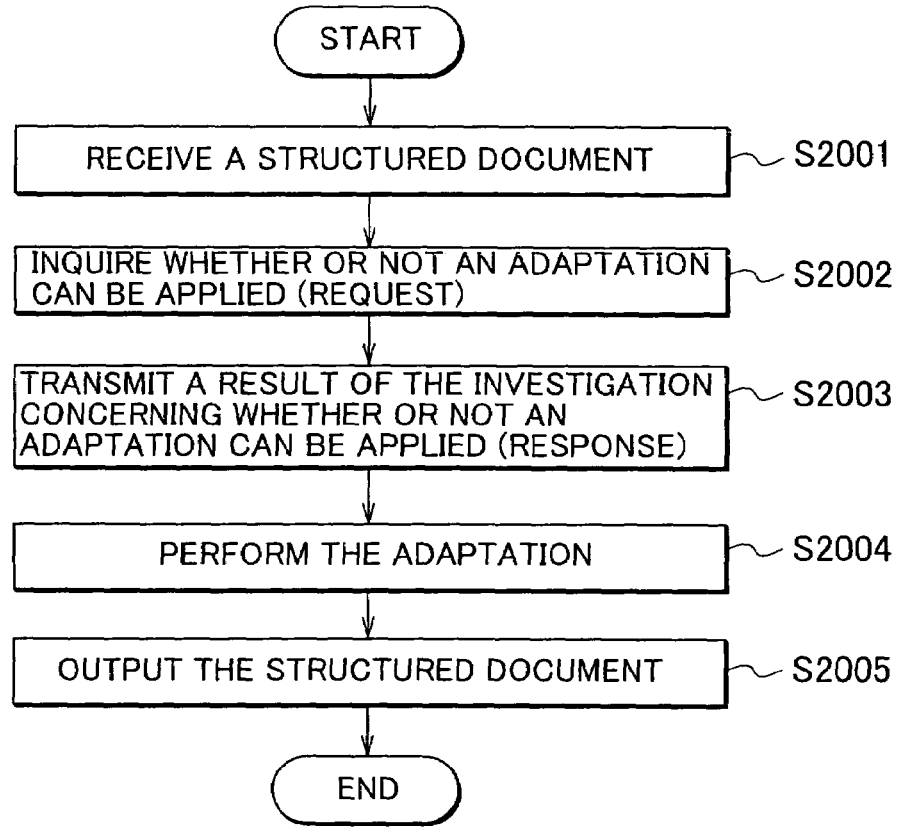
FIG. 17 is a flowchart showing an operation of a structured document adaptation device according to the first embodiment of the present invention.
FIG. 18 is a diagram showing an example of a request generated by the structured document adaptation device according to the first embodiment of the present invention.

Specifically, the adaptation determining unit 202 makes the aforementioned inquiries by a request shown in FIG. 18. In this point, it is assumed that the adaptation policy written in the XACML shown in FIG. 9 is used as an adaptation policy.

In a case where the adaptation determining unit 202 inquires whether or not the value "m1" of the element <Chapter1> can be deleted, in the request shown in FIG. 18, "policy1" which specifies an adaptation policy corresponding to the element <Chapter1> is inserted as the attribute value for an element <Attribute> which is a child element of an element <Resource>, and "text ( )" meaning to be a value of the element <Chapter1> is inserted as a value of an element <AttributeValue> which is a child element of the element <Attribute>. In addition, "delete" indicating that a type of an adaptation is "deletion" is inserted as a value of the element <AttributeValue> which is a child element of the element <Attribute> which is a child element of an element <Action>.

In step 2003, the adaptation policy investigating unit 203 refers to an adaptation policy corresponding to a received request, and investigates whether or not the element or the value of the element is permitted to be deleted, thereby returning a result of the investigation to the adaptation determining unit 202.

Specifically, the adaptation policy investigating unit 203 returns the aforementioned result of the investigation to the adaptation determining unit 202 by a response shown in FIG. 19.

The response shown in FIG. 19 indicates that the result of the investigation is that the element or the value of the element concerning the request is permitted to be deleted by an adaptation policy.

Incidentally, in a case where an element is deleted, the child elements of the element or the value of the element is also to be deleted concurrently.

Even in a case where there is such an inconsistency in adaptation policies that an element which is an object to be adapted is permitted to be deleted and a child element of the element which is an object to be adapted or the value of the element which is an object to be adapted is not permitted to be deleted, the element which is an object to be adapted is permitted to be deleted by giving priority to the adaptation policy corresponding to the element which is the object to be adapted.

In step 2004, in a case where the element or the value of the element is permitted to be deleted, the adaptation unit 204 performs the adaptation of the structured document (in other words, the deletion of the element or the value of the element).

At this point, when deleting the element, the adaptation unit 204 simultaneously deletes the value of the element and the child elements of the element.

In step 2005, the structured document outputting unit 205 outputs the structured document which is obtained after the adaptation is performed by the adaptation unit 204 so that the data is deleted.

In FIG. 20, an example of the structured document outputted individually is shown. In an example shown in FIG. 20, the value "m1" of the element <Chapter1> is deleted from the structured document shown in FIG. 12.

Incidentally, in a case where a plurality of objects to be adapted exist, the adaptation determining unit 202 generates requests concerning the respective objects to be adapted, and the adaptation unit 204 performs permitted adaptations whenever necessary.

Figure 21:
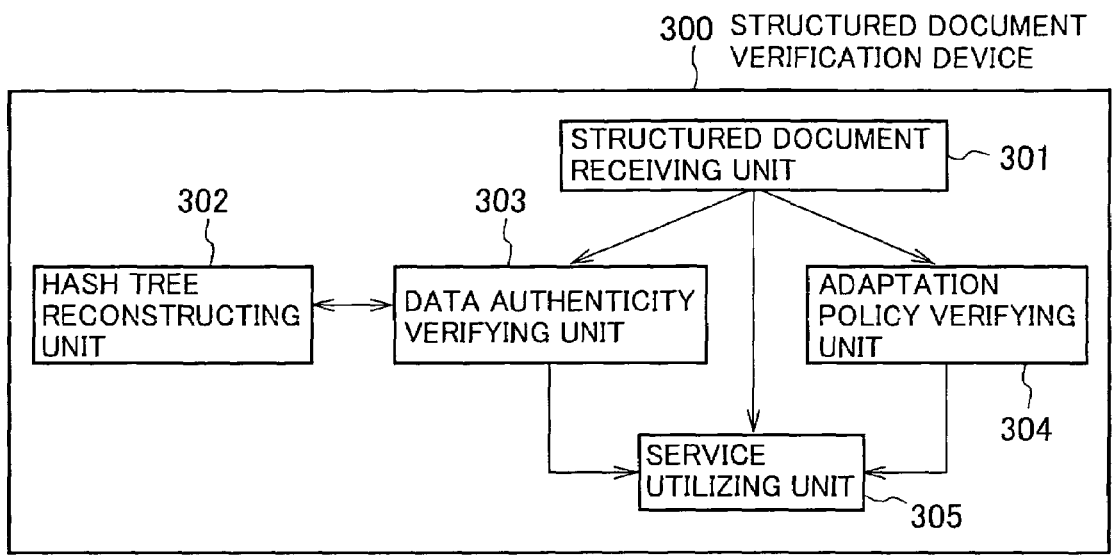
FIG. 21 is a block diagram showing a function of a structured document verification device according to embodiments of the present invention.

Thirdly, a description will be provided for a structured document verification device 300. As shown in FIG. 21, the structured document verification device 300 includes a structured document receiving unit 301, a hash tree reconstructing unit 302, a data authenticity verifying unit 303, an adaptation policy verifying unit 304 and a service utilizing unit 305.

The structured document receiving unit 301 is configured to analyze the structure of a received structured document, and to output an analyzed structured document to the data authenticity verifying unit 303, the adaptation policy verifying unit 304 and the service utilizing unit 305.

On a basis of a received structured document, the hash tree reconstructing unit 302 is configured to reconstruct a hash tree comprised of the elements and the values of the respective elements forming the structured document.

Specifically, the hash tree reconstructing unit 302 is configured to insert the hash values of the child elements of the respective elements and the hash values of the values of the respective elements as the attribute values of the respective elements forming the structured document, and to reconstruct a hash tree having the hash values of the respective elements including the attribute values as constituting elements.

The data authenticity verifying unit 303 is configured to verify the authenticity of a digital signature of the structured document signature device 100, which has been added to the received structured document, by use of the adaptation policy and the root of the hash tree reconstructed by the hash tree reconstructing unit 302.

In other words, the data authenticity verifying unit 303 is configured to verify whether or not the adaptation policy and the structured document have been generated by the structured document signature device 100.

The adaptation policy verifying unit 304 is configured to verify whether or not the received structured document has been adapted in accordance with the adaptation policy specified by the structured document.

The service utilizing unit 305 is configured to utilize the structured document as an authentic one in response to a result of the verifications by the data authenticity verifying unit 303 and the adaptation policy verifying unit 304.

Figure 22:
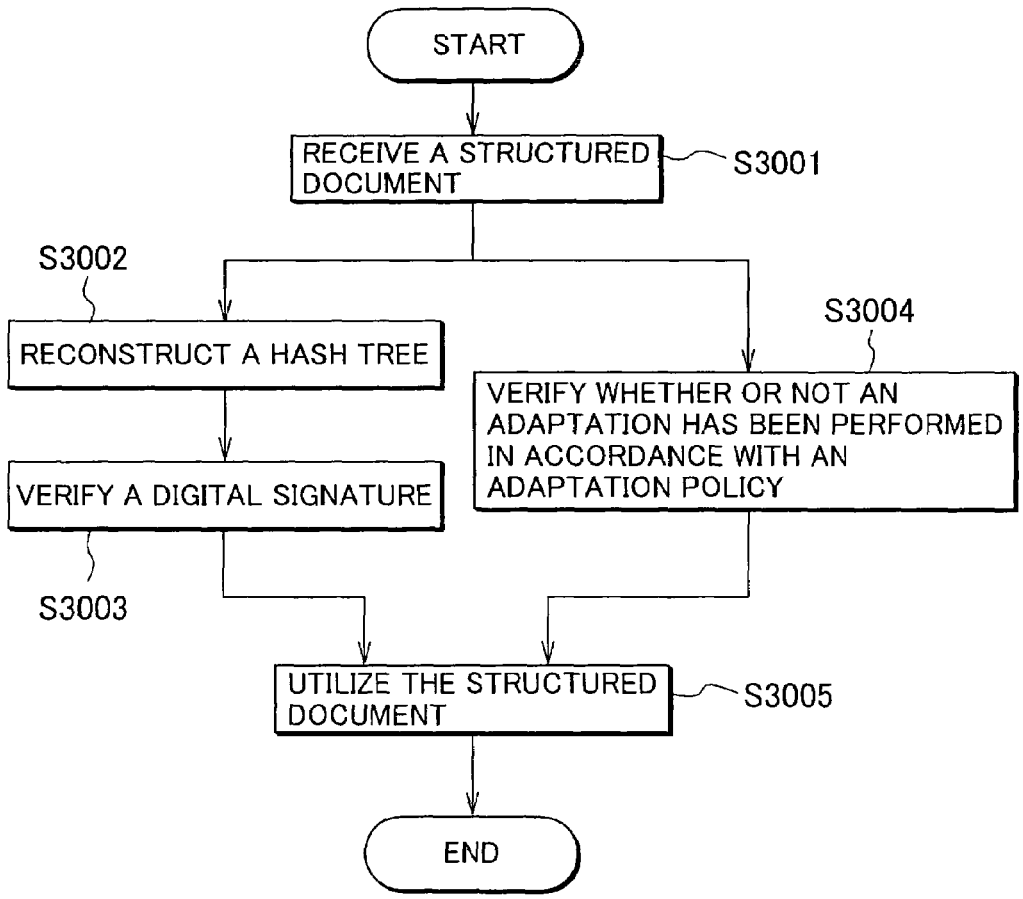
FIG. 22 is a flowchart showing an operation of a structured document verification device according to the first embodiment of the present invention.

With reference to FIG. 22, a specific description will be provided for an operation of the structured document verification device 300.

As shown in FIG. 22, in step 3001, the structured document receiving unit 301 analyzes the structure of a received structured document, and outputs an analyzed structured document to the data authenticity verifying unit 303 and the adaptation policy verifying unit 304.

In step 3002, on a basis of a structured document received through the data authenticity verifying unit 303, the hash tree reconstructing unit 302 reconstructs a hash tree including the elements and the values of the respective elements forming the structured document.

Specifically, the hash tree reconstructing unit 302 reconstructs a hash tree as in the case of the hash tree constructing unit 103 of the structured document signature device 100.

In a case where a particular element has been deleted, the hash value of the particular element which has been inserted as the attribute value of the parent element of the particular element is taken as an element forming a hash tree corresponding to the particular element.

In a case where the value of a particular element is deleted, the hash value of the value which has been inserted as the attribute value of the particular element is taken as an element forming a hash tree corresponding to the value.

For example, in a case where the hash tree reconstructing unit 302 reconstructs a hash tree on a basis of a structured document shown in FIG. 20, since the value "m1" of an element <Chapter1> has been deleted, the hash tree reconstructing unit 302 uses the hash value of the value "m1" which has been inserted as the attribute value of the element <Chapter1> when generating an element forming the hash tree corresponding to the value of the element <Chapter1>.

In step 3003, the data authenticity verifying unit 303 verifies the authenticity of a digital signature of the structured document signature device 100 which has been added to the received structured document, by use of the adaptation policy specified in the structured document and the root of the hash tree which has been reconstructed by the hash tree reconstructing unit 302.

In step 3004, the adaptation policy verifying unit 304 verifies whether or not the received structured document has been adapted in accordance with the adaptation policy specified in the structured document.

In a case where a particular element has been deleted from the structured document, the hash value of the particular element remains in the attribute value of the parent element of the particular element.

In addition, in a case where the value of a particular element has been deleted, the hash value of the value of the particular element remains in the attribute value of the particular element.

For this reason, the adaptation policy verifying unit 304 can identify which part (an element or the value of an element) of the structured document has been deleted, and can verify whether or not a deleted part complies with the adaptation policy.

In a case where an adaptation policy is written in the XACML, the adaptation policy verifying unit 304 can generate a request for inquiring whether or not data, which is an object to be deleted, can be deleted, and can verify whether or not the deletion violates the adaptation policy in response to a response of whether or not the deletion of the data, which is an object to be deleted, is permitted.

In step 3005, the service utilizing unit 305 takes the structured document as authentic and uses the document, in response to a result of the verifications by the data authenticity verifying unit 303 and the adaptation policy verifying unit 304.

Operations and Effects of the First Embodiment of the Present Invention

According to the structured document signature device 100 of the first embodiment of the present invention, an adaptation policy can be assigned to each element, and an adaptation to each element and the value of the element can be restrained.

In addition, according to the structured document signature device 100 of the first embodiment of the present invention, the authenticity of a digital signature can be verified by use of a hash tree even after the adaptation of a structured document. For this reason, the authenticity of data (each element and the value of each element) to be provided can be verified.

In addition, according to the structured document signature device 100 of the first embodiment of the present invention, a terminal (for example, the structured document verifying unit 300) to receive a structured document can verify the authenticity of an adaptation policy applied to the received structured document.

Furthermore, according to the structured document signature device 100 of the first embodiment of the present invention, the terminal (for example, the structured document verifying unit 300) to receive a structured document can refer to an adaptation policy applied to the received structured document without outputting the adaptation policy. For this reason, an amount of communications can be reduced.

Additionally, according to the structured document signature device 100 of the first embodiment of the present invention, the adaptation policy inserting unit 102 can compile an adaptation policy when making the adaptation policy correspond to each element or the value of the element.

Further, according to the structured document signature device 100 of the first embodiment of the present invention, a hash tree is incorporated in a structured document. Thereby, the hash tree can be reconstructed from elements forming an incorporated hash tree, even in a case where an element or a value of an element has been deleted by an adaptation. When the element and the value of the element are deleted, the structured document adaptation device 200 does not have to calculate the hash values of the element and the value of the element, and to incorporate the hash values in the structured document. Consequently, an amount of processing can be reduced.

According to the structured document adaptation device 200 of the first embodiment of the present invention, a structured document can be adapted in accordance with an adaptation policy specified by the structured document.

In addition, according to the structured document adaptation device 200 of the first embodiment of the present invention, in the course of the adaptation of a structured document, an element or the value of an element is deleted, and the hash value of the value of a deleted element or the hash value of a deleted element is incorporated in the structured document. Thereby, the reconstructing of a hash tree can be performed by a terminal (for example, the structured document verifying unit 300) to receive the structured document.

According to the structured document verifying device 300 of the first embodiment of the present invention, it can be verified whether or not an adapted structured document has been adapted in accordance with an adaptation policy.

In addition, according to the structured document verifying device 300 of the first embodiment of the present invention, the authenticity of the digital signature added by the structured document signature device 100 is verified, and thereby it can be verified whether or not the structured document and the adaptation policy have been outputted by the structured document signature device 100.

Furthermore, according to the structured document verifying device 300 of the first embodiment of the present invention, a hash tree can be reconstructed even in a case where data (the value of an element or a child element of an element) is deleted by the structured document adaptation device 200.

A Second Embodiment of the Present Invention

Figures 23, 24:
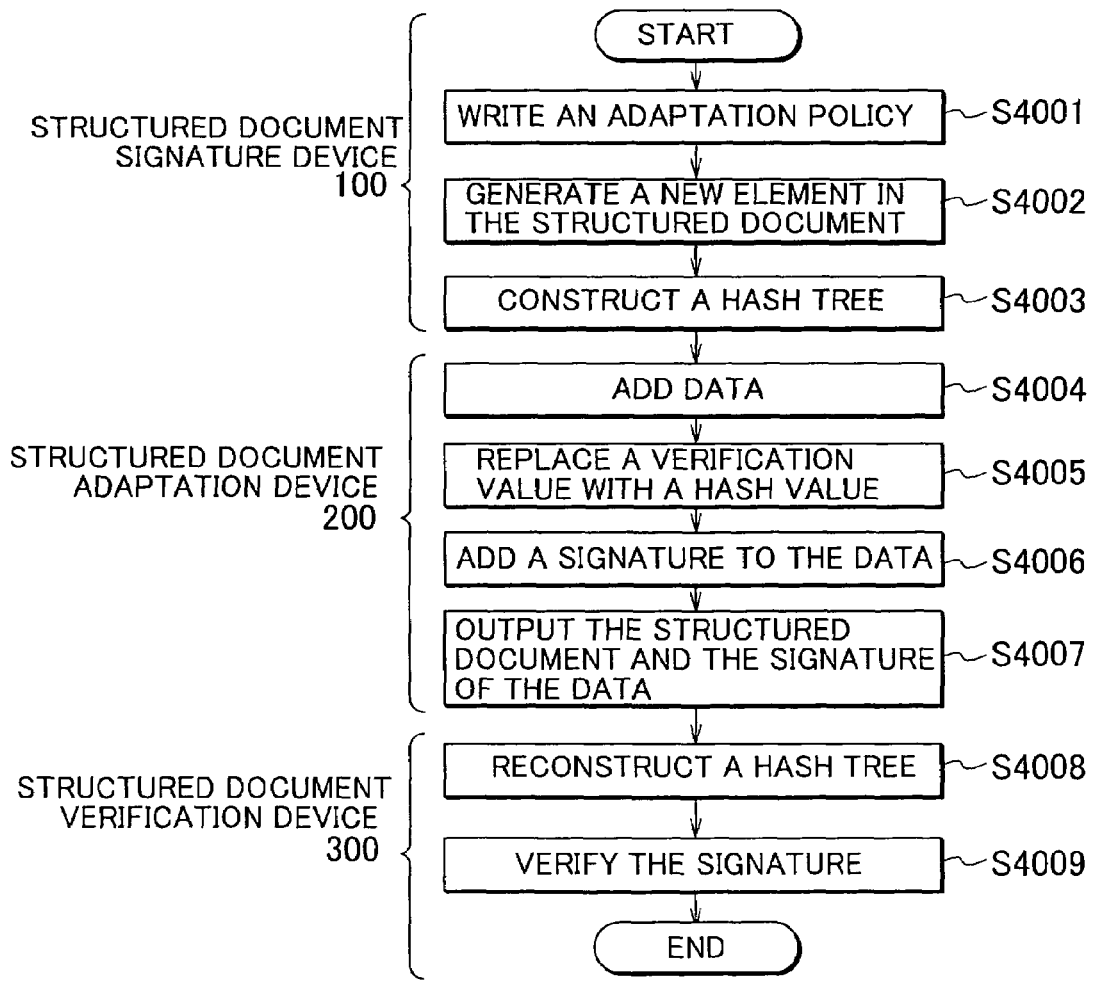
FIG. 23 is a diagram showing an example of a structured document in which a hash tree constructed by a structured document signature device according to a second embodiment of the present invention is incorporated.
FIG. 24 is a flowchart showing an operation of a structured document verification system according to a third embodiment of the present invention.

With reference to FIG. 23, a description will be provided for a second embodiment of the present invention. The structured document verification system according to the second embodiment will be described below focusing on its differences from the aforementioned structured document verification system according to the first embodiment.

In the second embodiment, a hash tree constructing unit 103 of the structured document signature device 100 is configured to construct a hash tree and calculate the root of the hash tree, and subsequently to delete the hash values of the values of the respective elements or the hash values of the child elements of the respective elements which have been inserted as attribute values to the elements forming the structured document.

The hash tree constructing unit 103 may be configured to delete the hash value of the value of a particular element, or the hash value of a child element of the particular element, which has been inserted as the attribute value to the particular element.

In a case where data (for example, an element or the value of an element) has been deleted by the adaptation unit 204 of the structured document adaptation unit 200, if no processing is applied to the data, an element forming the hash tree corresponding to a deleted data can not be calculated in the structured document verification device 300.

With this taken into consideration, in a case where the value of a particular element is deleted, the adaptation unit 204 inserts the hash value of the value as the attribute value of the particular element.

In addition, in a case where a particular element is deleted, the adaptation unit 204 inserts the hash value of the value of the particular element and the hash values of the child elements of the particular element as the attribute value of the particular element, as in the case of the aforementioned hash tree constructing unit 103.

The adaptation unit 204 inserts the hash values of all the child elements of an element to be deleted as the attribute values of the element, and inserts the hash value of the element for an attribute value of the parent element of the element. Thereafter, the adaptation unit 204 deletes the element.

A structured document to be obtained in a case where an element <Section1-2> has been deleted by the adaptation unit 204 is shown in FIG. 23.

In FIG. 23, when the element <Section1-2> is deleted, the deletion leads to the deleting of the element <Section1-2> and the value of the element <Section1-2>. "Ab" which is a constituting element (the hash value of the element <Section1-2>) forming the hash tree corresponding to the element <Section1-2> is inserted into the parent element <Chapter1> of the element <Section1-2>.

The structured document signature device 100 uses an element <Obligation> of an adaptation policy shown in FIG. 9, in order to instruct the structured document adaptation device 200 to perform the aforementioned series of operations.

Even in a case where data (an element or the value of an element) has been deleted from a structured document, a hash tree reconstructing unit 302 of the structured document verification device 300 can calculate an element forming the hash tree corresponding to a deleted data. For this reason, the hash tree can be reconstructed.

Operations and Effects of the Second Embodiment of the Present Invention

According to the structured document signature device 100 of the second embodiment, an element forming an incorporated hash tree is deleted from a structured document to be outputted from the structured document signature device 100. Accordingly, an amount of communications can be reduced.

A Third Embodiment of the Present Invention

With reference to FIGS. 24 to 30, a description will be provided for a third embodiment of the present invention. A structured document verification system according to the third embodiment will be described below focusing on its differences from the aforementioned structured document verification system according to the first embodiment.

In the third embodiment, a consideration will be given to a case that an "addition of data (an element or the value of an element)" is carried out as a type of an adaptation.

In this point, with regard to an element to which an addition is permitted, several cases are conceivable where violation of an adaptation policy is difficult to detect by a mere digital signature which has been added by a person to generate contents.

A first case of the violation of an adaptation policy is a case that data (an element or the value of an element) are added by a structured document adaptation device 200 which has not been permitted to perform the addition.

In addition, a second case of the violation of an adaptation policy is a case that an alteration is made to data added by a structured document adaptation device 200 which has been permitted to perform the addition.

Furthermore, a third case of the violation of an adaptation policy is a case that data added by a structured document adaptation device 200 which has been permitted to perform the addition is later deleted, and that a trace indicating the addition of the data is deleted.

In this point, the first and second cases of the violation of an adaptation policy can be detected by a digital signature added to an added data by a structured document adaptation device 200 which has been permitted to perform an addition.

In addition, the third case of the violation of an adaptation policy can be detected by making operations themselves for an adaptation irreversible.

With reference to FIGS. 24 to 30, a detailed description will be provided for operations to be performed when data are added in the structured document verification system according to the third embodiment.

As shown in FIG. 24, in step 4001, an adaptation policy inserting unit 102 of the structured document signature device 100 specifies a location (for example, the value of a particular element and a child element of a particular element) in which an adaptation (an addition of data) is permitted to be performed, and a structured document adaptation device 200 by which the adaptation (an addition of data) is permitted to be performed, thereby writing the location and the structured document adaptation device 200 in an adaptation policy.

In FIG. 25, an example of an adaptation policy which has been written in the XACML by the adaptation policy inserting unit 102 in step 4001 is shown.

In the adaptation policy shown in FIG. 25, the value "e13" of an element <Subject> indicates an ID of a structured document adaptation device which is permitted to perform an adaptation. The value "text( )" of an element <Resource> indicates the value of an element associated with the adaptation policy as a location in which the adaptation is permitted. The value "add" of an element <Action> indicates "addition of data" as a type of the adaptation.

In step 4002, the adaptation policy inserting unit 102 generates a new element which is associated with the adaptation policy, in the structured document.

In addition, the adaptation policy inserting unit 102 inserts a verification value and a public key of the structured document adaptation device 200 which is permitted to add data, as an attribute of the element.

Incidentally, the verification value is a string of random characters for verifying that an adaptation in violation of the adaptation policy is not applied to the aforementioned element, and the same verification value shall not be present for a different element.

In other words, in step 4002, verification means is provided for verifying that an adaptation in violation of the adaptation policy has not been applied to the aforementioned element.

Incidentally, the structured document verification device 300 verifies, by use of the verification means, that an adaptation in violation of the adaptation policy has not been applied to a particular element.

In FIG. 26, an example of a structured document in which a new element has been generated by the adaptation policy inserting unit 102 in step 4002 is shown.

As shown in FIG. 26, the adaptation policy inserting unit 102 inserts a URI "#Policy13" specifying an adaptation policy, a verification value "verifier13", and a public key "PKe1" of a structured document adaptation device 200 which is permitted to add data, into the attribute value of an element <Section1-3> which is a new element.

In the structured document shown in FIG. 26, an adaptation policy "Policy13 (see FIG. 25)" is configured to permit a new value to be added to the element <Section1-3>.

In step 4003, a hash tree constructing unit 103 constructs a hash tree, by taking the hash value of an element which is obtained by substituting a verification value which has been inserted as the attribute value of a newly generated element for the hash value of the verification value, as an element forming the hash tree corresponding to the element.

For example, an element forming the hash tree corresponding to the element <Section1-3> in FIG. 26 comes to be the hash value of the element <Section1-3> shown in FIG. 27.

In step 4004, the adaptation unit 204 of the structured document adaptation device 200 generates data to be added, and inserts a generated data as the value of the element to which data is permitted to be added by an adaptation policy.

FIG. 28 shows a structured document to be obtained when data is added to a structured document shown in FIG. 26 by the adaptation unit 204 in step 4004. In the structured document shown in FIG. 28, the value "m13" of an element <Section1-3> to which data is permitted to be added is added to the element.

In step 4005, the adaptation unit 204 replaces a verification value "verifier13" inserted as the attribute value of the element <Section1-3> with the hash value "h(verifier 13)" of the verification value, in order to prevent the data from being destroyed by a structured document adaptation device 200 which is to receive the structured document subsequently.

As a result of this, the addition of the data comes to be an irreversible action. For this reason, even if the data which have been added by the structured document adaptation device 200 is deleted by another structured document adaptation device 200, the structured document can not be returned to a condition existing before the data is added unless the verification value "verifier13" is restored at the same time.

In step 4006, the adaptation unit 204 adds a digital signature to the data, by use of the private key corresponding to the public key "PKe13" inserted as the attribute value of the element <Section1-3>, in order to prevent the data from being altered.

In step 4007, the structured document outputting unit 205 outputs the digital signature added to an added data along with the structured document to which the data has been added.

FIG. 29 shows an example of a document outputted by the structured document outputting unit 205. In the document shown in FIG. 29, the element <Signature> corresponding to the added data is expressed with an XML signature. In the document shown in FIG. 29, the element <Signature> indicating a digital signature of the added data is added (see FIG. 14).

FIG. 30 shows an example of the XML signature corresponding to the added data. In the XML signature shown in FIG. 30, an element <Reference> has the URI indicating the element <Section1-3> as its attribute value. By use of the private key corresponding to the aforementioned public key "PKe13", a digital signature which is obtained by encrypting the hash values of the entire element <Section1-3> is added.

Depending on a result of a verification by an adaptation policy verifying unit 304 of the structured document verification device 300, in step 4008, in a case where the value of an element to which data is permitted to be added has been added to the element, the hash tree reconstructing unit 302 reconstructs a hash tree without doing anything else.

In a case where no value of the element has been added, the hash tree reconstructing unit 302 replaces a verification value inserted as the attribute value of the element with the hash value of the verification value, and thereafter reconstructs a hash tree.

In addition, the hash tree reconstructing unit 302 may be configured to verify whether or not an adaptation has been applied to an element to which the value of the element is permitted to be added, in accordance with an adaptation policy.

In step 4009, a data authenticity verifying unit 303 verifies the authenticity of a digital signature of the structured document adaptation device 200, by use of a public key inserted as the attribute value of the element and the added value of the element.

Operations and Effects of the Third Embodiment of the Present Invention

According to the structured document signature device 100, and the structured document adaptation device 200, of the third embodiment, an addition of the value of an element can be performed as an adaptation of a structured document, and it can be verified that an adaptation in violation of the adaptation policy has not been applied to the element to which the value has been added.

According to the structured document verification device 300 of the third embodiment, it can be verified whether or not the value added to the element has not been deleted. In addition, it can be verified whether or not the addition of the value to the element is what is added by a structured document adaptation device which is permitted to perform the addition.

Fourth Embodiment of the Present Invention

With reference to FIGS. 31 to 33, a description will be provided for a fourth embodiment of the present invention. The structured document verification system according to the fourth embodiment will be described below focusing on its differences from the aforementioned structured document verification system according to the third embodiment.

In the fourth embodiment, an addition of data (an adaptation) by a structured document adaptation device 200 is realized by use of a method different from that of the aforementioned third embodiment.

Specifically, a detection of an alteration in violation of an adaptation policy is realized by use of properties of a trapdoor hash function.

In other words, in the fourth embodiment, as shown below, verifying means for verifying that an adaptation in violation of an adaptation policy has not been applied to a particular element is provided, by use of the properties of the trapdoor hash function. The trapdoor hash function is a hash function in which a collision can be produced intentionally by use of a private key.

For example, let's consider the hash value "H(m', r')" of a combination of values "(m'(a first value), r'(a second value))".

In general hash functions, it is very difficult to find a combination of values "(m, r)", whose hash value is equal to "H(m', r')", from "H(m', r')".

However, in a case where "H" is a trapdoor hash function and "H" is hashed by its intrinsic hash key "HK", "r" by which H(m', r')=H(m, r) in relation to an arbitrary "m" can be easily calculated with the private key "PK" paired with the hash key "HK", "m'", "r'"0 and "H(m', r')".

The trapdoor hash function has been disclosed in H. Krawczyk and T. Rabin, "Chameleon Hashing and Signatures", In Proc. of NDSS 2000, The Internet Society (2000).

With regard to FIGS. 31 to 33, a detailed description will be provided for operations to be performed in a case where data are added in the structured document verification system according to the fourth embodiment.

First of all, the adaptation policy inserting unit 102 of the structured document signature device 100 calculates a hash value by a trapdoor hash function from a hash key which is made public by a structured document adaptation device 200 which is permitted by an adaptation policy to perform an adaptation, and a combination of arbitrarily chosen values, and then inserts the hash value as the attribute value of an element which permits data to be added thereinto.

A structured document shown in FIG. 31 is what is obtained by incorporating a hash value "H(m13', r13')" in a structured document with an adaptation policy shown in FIG. 10. The hash value "H(m13', r13')" is calculated by a trapdoor hash function, by use of a combination "(m13', r13')" of arbitrarily chosen values and a hash key "HK" of a structured document adaptation device 200 which is permitted to perform an adaptation.

In a structured document shown in FIG. 31, an element <Section1-3> is generated as a new child element of an element <Chapter1>, as in the case of the aforementioned third embodiment. In addition, a hash value "H(m13', r13')" and "r13'" are inserted as the attribute values of the element <Section1-3>. Furthermore, "m13'" is inserted as the value of the element <Section1-3>.

Here, an element forming the hash tree corresponding to the element <Section1-3> is equal to the hash value of the starting tag of the element <Section1-3> excluding "r13'", as shown in FIG. 32.

Second, the adaptation unit 204 of the structured document adaptation unit 200 generates data to be added, and calculates a value paired with a generated data, by use of the generated data, a combination of values which the structured document signature device 100 has arbitrarily chosen, a hash value generated by a trapdoor hash function, and the private key corresponding to the aforementioned hash key.

Here, because of properties of the trapdoor hash function, a hash value which can be found by the value paired with the data to be added is equal to a hash value which is found by the combination of the values which the structured document signature device has arbitrarily chosen.

Third, the adaptation unit 204 replaces the data to be added with the value ("m13'" in an example shown in FIG. 31) of an element to which the data are permitted to be added, and replaces the value paired with the data to be added with a value ("r13'" in an example shown in FIG. 31) inserted as the attribute value of the element.

FIG. 33 shows a structured document to be obtained after an adaptation (an addition of data) has been applied to the structured document shown in FIG. 31 by the adaptation unit 204 of the structured document adaptation device 200.

In FIG. 33, the value "m13'" of the element <Section1-3> in FIG. 31 has been replaced with the data "m13" to be added, and the value "r13'" inserted as the attribute value of the element <Section1-3> in FIG. 31 has been replaced with the value "r13" paired with "m13".

In addition, because of the properties of the trapdoor hash function, "H(m13', r13')" is equal to "H(m13, r13)". Furthermore, since "m13'" and "r13'" are discarded, an addition of the data is irreversible.

Fourth, the adaptation policy verifying unit 304 of the structured document verification device 300 calculates a hash value by use of the trapdoor hash function from the value of an element to which data (the value of an element) is permitted to be added, a value inserted as the attribute value of the element, and a hash key to be made public by the structured document adaptation device 200 which has performed the addition of the data.

In addition, a hash value inserted as the attribute value of the element is verified in terms of whether or not the hash value is equal to a calculated hash value.

Fifth, a hash tree reconstructing unit 302 reconstructs a hash tree on a basis of the structured document, and a data authenticity verifying unit 303 verifies the authenticity of a digital signature added by the structured document signature device 100.

For example, in a case where a structured document shown in FIG. 33 is received, an adaptation policy verifying unit 304 calculates "H(m13, r13)" from "m13" and "r13," and verifies whether or not a calculated "H(m13, r13)" is equal to a hash value H(m13', r13') inserted as the attribute value of the element <Section1-3>. In response to a result of the verification, the hash tree reconstructing unit 302 reconstructs a hash tree.

If a third party who does not know the private key corresponding to the hash key intends to alter "m13" into "m13'", it is difficult to find "r13'" by which "H(m13', r13')"="H(m13", r13")". For this reason, an alteration is to be detected by any one of a verification of the authenticity of the hash value and a verification of the authenticity of the digital signature.

As described above, according to the present invention, it is possible to provide the structured document signature device, the structured document adaptation device, and the structured document verification device, which can solve the problems brought about by the conventional digital signature method applied to a structured document.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A structured document signature device for attaching a digital signature to a structured document composed of a plurality of elements, the plurality of elements are hierarchized, comprising:
    an adaptation policy inserting unit configured to insert a value indicating an adaptation policy applied to an object element, as an attribute value of the object element, while changing the object element, the object element being any one of the plurality of elements;
    a hash tree constructor configured to construct a hash tree composed of a hash value of the plurality of elements by calculating the hash value of the object elements in sequence, while changing the object element from an object element lowest in the hierarchy to an object element highest in the hierarchy;
    a digital signature adder configured to add a digital signature which has been obtained by encrypting the hash value of the element highest in the hierarchy to the structured document, and add a digital signature which has been obtained by encrypting the value indicating the adaptation policy to the structured document; and
    an output configured to output the structured document to which the digital signature has been attached by the digital signature adder, wherein
    the hash tree constructor is configured to calculate the hash value of the object element and insert the hash value of a child element provided lower in the hierarchy than the object element as an other attribute value of the object element, and
    the adaptation policy indicates whether or not the child element has been permitted to be deleted.

2. The structured document signature device according to claim 1, wherein the output is configured to output the adaptation policy along with the structured document and the digital signatures.

3. The structured document signature device according to claim 1, further comprising
    an adaptation policy associator configured to associate the object element with the adaptation policy, by use of information indicating a location of the adaptation policy.

4. The structured document signature device according to claim 3, wherein the adaptation policy associator comprises a compiler configured to compile the adaptation policy.

5. The structured document signature device according to claim 1, wherein the hash tree constructor is configured to delete the hash value inserted as the other attribute value.

6. The structured document signature device according to claim 1, comprising
    a verification setter configured to set verification means for verifying that an addition of a value in violation of the adaptation policy associated with the element has not been made to the element.

7. A structured document verification device for verifying a structured document composed of a plurality of elements, the plurality of elements are hierarchized, comprising:
    an adaptation verifier configured to specify an adaptation policy applied to an object element, based on a value indicating the adaptation policy and inserted as an attribute value of the object element, while changing the object element, and to verify whether the object element is applied in accordance with the specified adaptation policy, the object element being any one of the plurality of the elements;
    a hash tree reconstructor configured to reconstruct a hash tree composed of a hash value of the plurality of elements by calculating a hash value of the object elements in sequence, while changing the object element from an object element lowest in the hierarchy to an object element highest in the hierarchy; and
    a digital signature verifier configured to verify an authenticity of a digital signature added to the structured document, based on a hash value of the element highest in the hierarchy, wherein the adaptation policy indicates whether or not a child element, provided lower in the hierarchy than the object element, has been permitted to be deleted,
    the hash value of the child element has been inserted as an other attribute value of the object element,
    the adaptation verifier is configured to judge whether the child element is deleted, based on the hash tree reconstructed by the hash tree reconstructor and the hash value of the child element inserted as the other attribute of the object element, and the adaptation verifier is configured to verify whether the child element has been deleted in accordance with the specified adaptation policy when the child element has been deleted, to specify the deleted element, and to determine whether or not the deleted element has been permitted to be deleted.

8. The structured document signature device according to claim 1, wherein the hash tree constructor is configured to construct a hash tree comprised of a hash value of a value of a plurality of elements, in addition to the hash value of the plurality of elements, the hash tree constructor is configured to calculate a hash value of the object element, and insert the hash value of the object element as an additional attribute value of the object element, and the adaptation policy is a policy to define the adaptation of the value of the object element.

9. The structured document verification device according to claim 7, wherein the hash tree reconstructor is configured to reconstruct a hash tree comprised of a hash value of a value of a plurality of elements, in addition to the hash value of the plurality of elements, the adaptation policy is a policy to define an adaptation of the value of the object element, the hash value of the value of the object element is inserted as an additional attribute value of the object element, the adaptation verifier is configured to judge whether the value of the object element is deleted based on the hash tree reconstructed by the hash tree reconstructor and the hash value of the value of the object element inserted as the additional attribute value of the object element, and the adaptation verifier is configured to verify whether the value of the object element has been deleted in accordance with the specified adaptation policy when the value of the object element has been deleted.

* * * * *

UNITED STATES PATENT AND TRADEMARK OFFICE
CERTIFICATE OF CORRECTION

| | | |
|---|---|---|
| PATENT NO. | : 7,639,818 B2 | Page 1 of 1 |
| APPLICATION NO. | : 10/942866 | |
| DATED | : December 29, 2009 | |
| INVENTOR(S) | : Fujimoto et al. | |

It is certified that error appears in the above-identified patent and that said Letters Patent is hereby corrected as shown below:

On the title page, Item (30), the Foreign Application Priority Data is incorrect. Item (30) should read:

-- (30)    Foreign Application Priority Data

Sep. 19, 2003    (JP) ............................... 2003-329175 --

Signed and Sealed this

Sixteenth Day of March, 2010

David J. Kappos
*Director of the United States Patent and Trademark Office*